Patented June 30, 1942

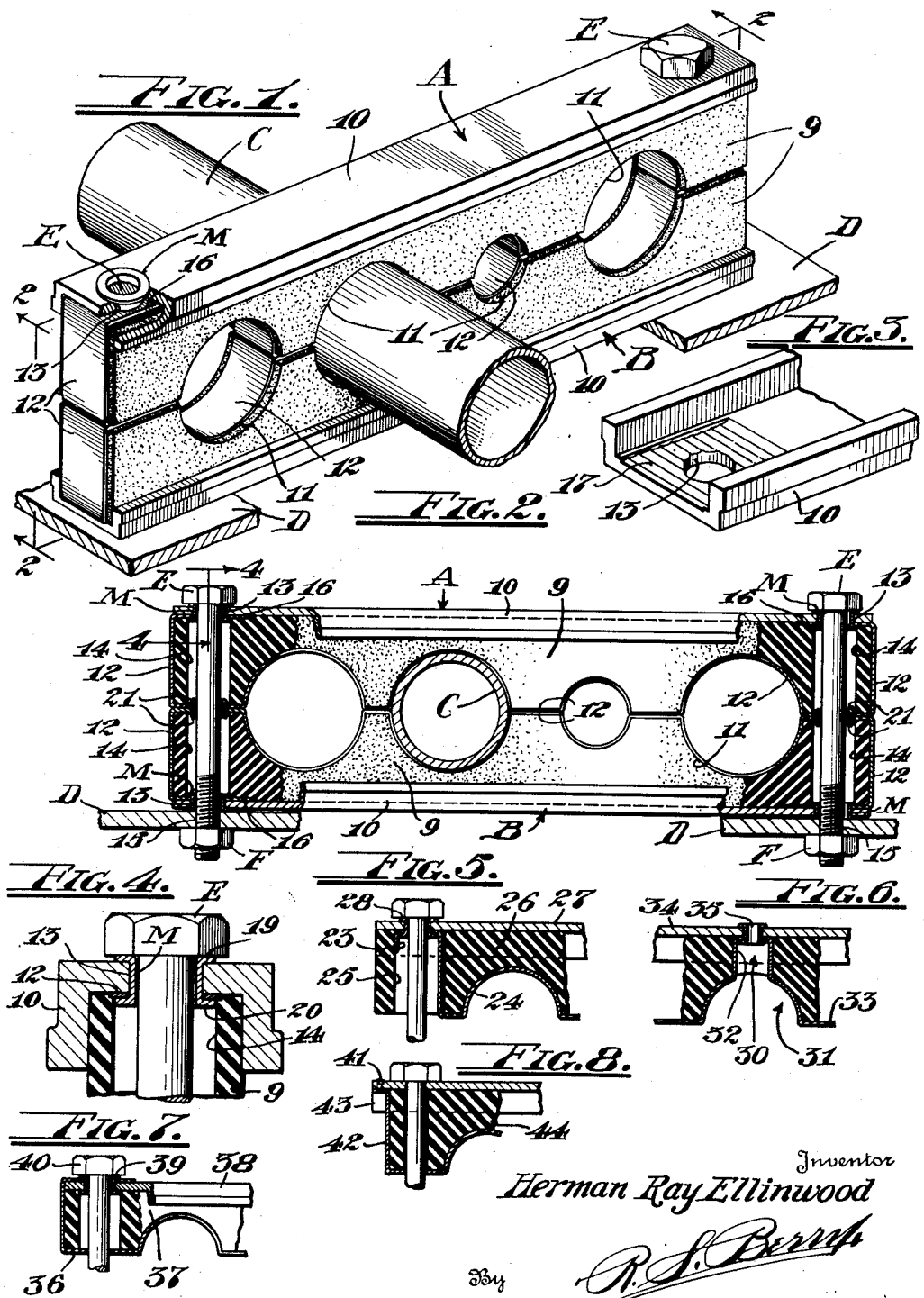

2,288,158

UNITED STATES PATENT OFFICE 2,288,158

CONDUIT SUPPORTING BLOCK

Herman Ray Ellinwood, Burbank, Calif., assignor to Adel Precision Products Corp., Burbank, Calif., a corporation of California Application February 18, 1941, Serial No. 379,454

9 Claims. (Cl. 174—135)

This invention relates to conduit supports of the block type for providing a cushioned and electrically bonded connection of the conduit lines of an airplane to the metallic structure of the airplane in order to prevent excessive vibration of the conduits and dangerous accumulations and discharges of static electricity relative thereto.

Such a block is disclosed in United States Letters Patent Number 2,227,528 issued to Paul W. Adler on January 7, 1941, and generally includes a block of compressible, resilient insulating material having transverse conduit receiving channels or grooves and adapted to be supported under compression by and between metallic backing members at least one of which is secured to and electrically contacts a part of the metallic structure of the airplane, there being a bonding strip lying in the channels or grooves for contact with the conduits and which is also in contact with said one metallic backing member. Usually the bonding strip has an apertured terminal position which lies between the block and one of the metallic backing members so that a bolt employed for holding the block and backing members together and securing at least one of the backing members to the metallic structures of the airplane will extend through the aperture in said terminal portion to hold the strip in place and in good contact with the adjacent backing member.

No provision is made in these blocks for effectively securing the bonding strip in place other than the aforesaid bolt and therefore the strip is subject to displacement before the bolt is inserted in place and during the assembling and handling of the unit. Moreover the electrical connection of the strip with the metallic structure of the plane is effected through the backing member and is sometimes impaired where the metallic member is given certain finishes. In other words the backing member does not provide for as good a bonding with the metal structure of the airplane as would be afforded by the direct contact of the strip itself with said structure or by a small metallic part engaged with the strip and disposed on the backing member for direct contact with said metal structure of the airplane, without depending on the conductivity of said backing member.

One of the objects of the present invention is to provide an improved conduit supporting block of the character described wherein the objections as to displacement of the bonding strip and poor conductivity and uncertain electrical connection of the strip with the metallic structure of the airplane are eliminated by means of a combined fastener and conductor permanently fixing the strip to the backing members and disposed for direct contact with the metallic structure on which the block is mounted. This combined fastener and conductor may be in the form of a hollow rivet or eyelet of the same metal as the strip or of such other metal as will provide for the most effective and reliable bonding of the conduits to the metallic structure of the airplane without depending on the conductivity of the backing members; the hollow construction of the rivet affording the convenient use of bolts as heretofore for holding the body of the block compressed between and in assembled relation to the metal backing members as well as for holding the strip in good contact with the conduits supported by the block.

With the foregoing objects in view together with such other objects and advantages as may subsequently appear the invention is carried into effect as illustrated by way of example in the accompanying drawing in which:

Fig. 1 is a fragmentary perspective view of a conduit supporting block embodying my invention;

Fig. 2 is a sectional view taken on the plane of line 2—2 of Fig. 1;

Fig. 3 is a fragmentary enlarged perspective view of an end of one of the banking members, showing the milled contact surface thereof;

Fig. 4 is an enlarged fragmentary sectional view taken on the line 4—4 of Fig. 2;

Figs. 5, 6, 7 and 8 are fragmentary sectional views respectively showing modified forms of my invention.

Referring to the drawing more specifically A and B designate complementary block sections adapted to clamp and support between them conduits such as the one C here shown, at least one of said sections being adapted to be secured upon a metallic structural part D of an airplane as by means of bolts E and nuts F.

Each of the sections A and B comprises an elongated body portion 9 of compressible, resilient and insulating material such as soft rubber, synthetic rubber or similar material, having a relatively rigid metallic channel 10 embracing one longitudinal edge or margin thereof as a backing member, and provided on the opposite edge with transverse grooves or channels 11 for reception of the conduits.

An electrically conductive grounding or bonding strip 12 is provided on at least one of the sections A and B to lie along the unbounded edge or face and in the grooves or channels 11 whereby to closely contact the conduits. As here shown each of the sections A and B is provided with a bonding strip 12.

The grooves or channels of the sections A and B are complementary whereby the compressible blocks 9 will snugly embrace and clamp around the conduits to bring the bonding strip 12 in intimate contact therewith and also provide a cushioned and shock and vibration absorbing support of the conduits, the strips being preferably narrower than the compressible blocks to enhance the cushioning action.

The bolts E extend through openings 13 and 14 in the backing channels or members 10 and blocks 9 respectively and also through openings 15 in the metallic structure D of the airplane as shown in Fig. 2, to hold the blocks 9 under compression and clamped on the conduits as well as to secure the unit to the airplane structure.

The present invention deals particularly with the manner of permanently securing the bonding strip in place and of insuring an effective electrical connection thereof with the metallic structure of the airplane to which it is desired to bond the conduits to prevent dangerous accumulations and discharges of static electricity relative thereto. To this end I provide a small metallic fastening element M for fixing the bonding strip to at least one of the metallic backing members 10 in such manner that not only is said strip permanently held on and maintained in good contact with said backing member and said fastening element, but said fastening element is exposed for direct contact with the metal structure of the airplane such as part D, to which the backing member is secured by the bolt E and nut F whereby the main bonding contact or connection is through the fastening element and the conductivity of the backing member need not be depended on. This is important due to the fact that it is not practical to use metal in the backing member which is the same or equal to that of the bonding strip as to conductive qualities and moreover due to the fact that certain surface and protective finishes of such backing members often impair the surface conductivity thereof which is relied on to bond the conduits to the metallic structure of the plane.

Furthermore the use of the fastening element M as aforesaid makes possible the bonding with similar metals to eliminate electrolytic actions which might otherwise take place.

In the embodiment of my invention shown in Figs. 1 to 4 inclusive the two bonding strips 12 extend around the ends of the blocks 9 and have apertured terminals 16 which lie between the blocks 9 and backing members 10 and are secured to such members by means of the fastening element M. Preferably the fastening elements M are in the form of hollow rivets or eyelets of the same or similar metal as used in bonding strips. The outer ends of the hollow rivets M are exposed on the outer surfaces of the facing strips and therefore will contact the airplane structure as shown at D in Figs. 1 and 2. The hollow construction of the rivets M permits of free passage of the bolts E therethrough as shown in Fig. 2.

While I have shown two bonding strips 12 and four rivets M it is obvious that I may use but one bonding strip between the sections A and B if desired and may also secure with a rivet M, but one end of each strip used, this being of course an end at which the supporting block is to be affixed to the airplane structure D.

As the bolts E pass through and also at their heads contact the hollow rivet M, said bolts assist in electrically bonding the conduit to the metallic structure of the airplane as will be apparent with reference to Fig. 2. Since the bonding strips do contact the backing members a good electrical contact therebetween is assured by milling the surfaces as at 17 (Fig. 3) around the opening 13 in the ends of said members, so that said members are bonded to the other metal components of the multiple conduit supporting unit of this invention.

It should be noted that the hollow rivets M provide on the outer surfaces of the backing members raised annular contacts 19 which will first contact with any metallic structure to which the backing strips are secured and will also contact the heads or nuts of the bolts, there being similar contacts 20 on the inner ends of these rivets, for contacting and holding the bonding strips in proper position at all times. It should be here noted that the openings 14 in the compressible blocks 9 are of greater diameter than openings 13 in the backing members, to facilitate the riveting of the fastenings M and that where the bonding strips come together at the ends of the sections A and B they have registering openings 21 for reception of the bolts as shown in Fig. 2.

With reference to Fig. 5 a modified form of my invention consists in extending a terminal portion 23 of the bonding strip 24 into the bolt receiving opening 25 in the compressible block 26 instead of around the outer end of said block, and securing the strip to the metal backing member 27 by means of a hollow rivet 28 which serves the same purposes and is identical with the rivet M. In all other respects this modified form is the same as the first described form shown in Figs. 1 to 4 inclusive, but it affords better protection of the bonding strip as no part thereof is exposed on the block when the latter is in use.

In Fig. 6 another modified form of my invention takes into consideration the formation of an opening 30 in the compressible block which opening leads into one of the conduit receiving grooves or channels 31, and extruding a loop portion 32 of the bonding strip outwardly through said opening for contact with the metal backing member 34, and securing the loop portion 32 to the backing member by means of a hollow rivet 35 identical with rivets M and 28 and which serves the same purpose. This form may be desirable in certain instances.

The modified form of my invention shown in Fig. 7 includes the extension of the bonding strip 36 around the end of the block 37 and backing 38 so as to lie upon the outer side of the backing members where it is secured by a hollow rivet 39 which will contact with the metal structure of the airplane not shown and with the head of the bolt 40. In all other respects this form of my invention is the same as shown in Figs. 1 to 4 inclusive.

Another modified form shown in Fig. 8 takes into consideration the spot welding as at 41 of the bonding strip 42 to the inner surface of the metal backing member 43 at a point beyond the adjacent end of compressible block 44, after the strip has been extended around said end of the block then laterally along the under side of the relatively extended end of the backing member. This form while affording a good permanent fixation and contact of the bonding strip depends on conductivity of the backing member in order to bond the conduits to the metal structure of the airplane (not shown). In all other respects this form of my invention is the same as that shown in Figs. 1 to 4 inclusive.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a conduit support, a cushioning block of compressible resilient insulating material, and having conduit receiving channels, a pliable electrically conductive bonding strip disposed on said block for effecting electrical connection between metallic conduits disposed in said channels, a metallic support for said block, a metallic fastening element for securing said strip to said metallic support, having an end portion exposed on said metallic support for direct electrical contact with a metallic structure to which it is desired to electrically bond the conduits and means associated with said metallic support for clamping said block against said conduits and holding said end portion of said fastening element against said metallic structure.

2. In a conduit support, a cushioning block of compressible resilient insulating material, and having conduit receiving channels, a pliable electrically conductive bonding strip disposed on said block for effecting electrical connection between metallic conduits disposed in said channels, a metallic support for said block, a metallic fastening element for securing said strip to said metallic support, having a portion exposed on said metallic support for direct electrical contact with a metallic structure to which it is desired to electrically bond the conduits and means associated with said metallic support for clamping said block against said conduits and securing said metallic support to said metallic structure with said exposed portion of said fastening element held in electrical contact with said metallic structure and the last named means.

3. In a conduit support, a cushioning block of compressible resilient insulating material, and having conduit receiving channels, a pliable electrically conductive bonding strip disposed on said block for effecting electrical connection between metallic conduits disposed in said channels, a metallic support for said block, a metallic fastening element for securing said strip to said metallic support, having a portion exposed on said metallic support for direct electrical contact with a metallic structure to which it is desired to electrically bond the conduits and means associated with said metallic support for clamping said block against said conduits, said fastening element being tubular and said means for clamping said block against the conduits including a bolt extending through and contacting said fastening element.

4. In a conduit support, a cushioning block of compressible resilient insulating material, and having conduit receiving channels, a pliable electrically conductive bonding strip disposed on said block for effecting electrical connection between metallic conduits disposed in said channels, a metallic support for said block, a metallic fastening element for securing said strip to said metallic support, having a portion exposed on said metallic support for direct electrical contact with a metallic structure to which it is desired to electrically bond the conduits and means associated with said metallic support for clamping said block against said conduits, said metallic fastening means being in the form of a hollow rivet in which one riveted end constitutes the said exposed portion, said means for clamping said block against the conduits including a fastening member passing through said hollow rivet.

5. In a conduit support, a cushioning block of compressible resilient insulating material having conduit receiving channels, a metallic pliable electrical bonding strip disposed in part in said channels for effecting electrical connection with metallic conduits disposed in said channels, a rigid support for said block, a metallic fastening element for securing said strip to said rigid support having an end portion in permanent electrical contact with said strip and its other end portion exposed on said rigid support for direct contact with a metallic structure to which it is desired to electrically bond said conduits, and means associated with said rigid support for clamping said block against said conduits and said other end portion against said metallic structure including a metallic fastening member in contact with said metallic fastening element.

6. In a conduit support, a cushioning and supporting block of compressible resilient, insulating material having conduit receiving channels, a rigid support for said block, a pliable metallic electrical bonding strip on said block having portions in said channels for electrically connecting metal conduits disposed in said channels, means including the rigid support for clamping the block and strip against said conduits and a metallic means serving the double function apart from said clamping means, of fixing the strip to the rigid support and maintaining the outer surface of an end thereof in contact with the metallic structure on which it is desired to mount the conduit support.

7. In a conduit support, an elongated conduit supporting and cushioning block of compressible resilient insulating material having a conduit receiving channel extending transversely across one longitudinal edge thereof, a metallic support for the block mounted on the other longitudinal edge thereof, a pliable metallic electrical bonding strip mounted on and extending longitudinally of said block with a portion lying in said channel and a portion in contact with said metallic support, means including said metallic support for clamping said block and said strip against a metallic conduit disposed in said channel, and metallic fastening means apart from said clamping means for permanently securing said strip to and electrically connecting it with said metallic support, said metallic fastening means having an exterior portion exposed on an exterior part of the metallic support for direct contact with a metallic structure to which it is desired to bond said conduit.

8. In a conduit support, a pair of elongated compressible and resilient conduit support and cushioning blocks adapted to be disposed face to face on opposite sides of metallic conduits to be supported thereby and having transverse conduit receiving channels in their opposed faces, metallic backing members mounted on said blocks, means associated with said backing members for clamping the blocks against conduits positioned in said channels, a pliable electrical bonding strip on at least one of said blocks and extending into and between said channels to provide an electrical connection between the metallic conduits gripped between said blocks, and metallic fastening means apart from said clamping means for fixing the strip to and in electrical connection with at least one of said backing members, said metallic fastening means having an exterior portion for contacting a metallic structure on which the conduit support is mounted.

9. In a conduit support, a pair of blocks formed of resilient insulating material adapted to be disposed face to face on opposite sides of metallic conduits to be supported thereby, said blocks being formed with oppose transverse channels on the contiguous faces thereof to receive the conduits, a pliable electrically conductive strip extending longitudinally between said blocks and conforming to the channeled face of at least one of said blocks and adapted to contact conduits supported between said blocks in said channels, means for clamping said blocks together, and means for grounding said strip to prevent accumulation of static electricity including a metallic fastening element passing through the strip and said one backing member and having the outer surface of one end thereof disposed on said one backing member for direct contact with a metallic structure to which it is desired to bond the conduits through said strip and said fastening element.

HERMAN RAY ELLINWOOD.